UNITED STATES PATENT OFFICE.

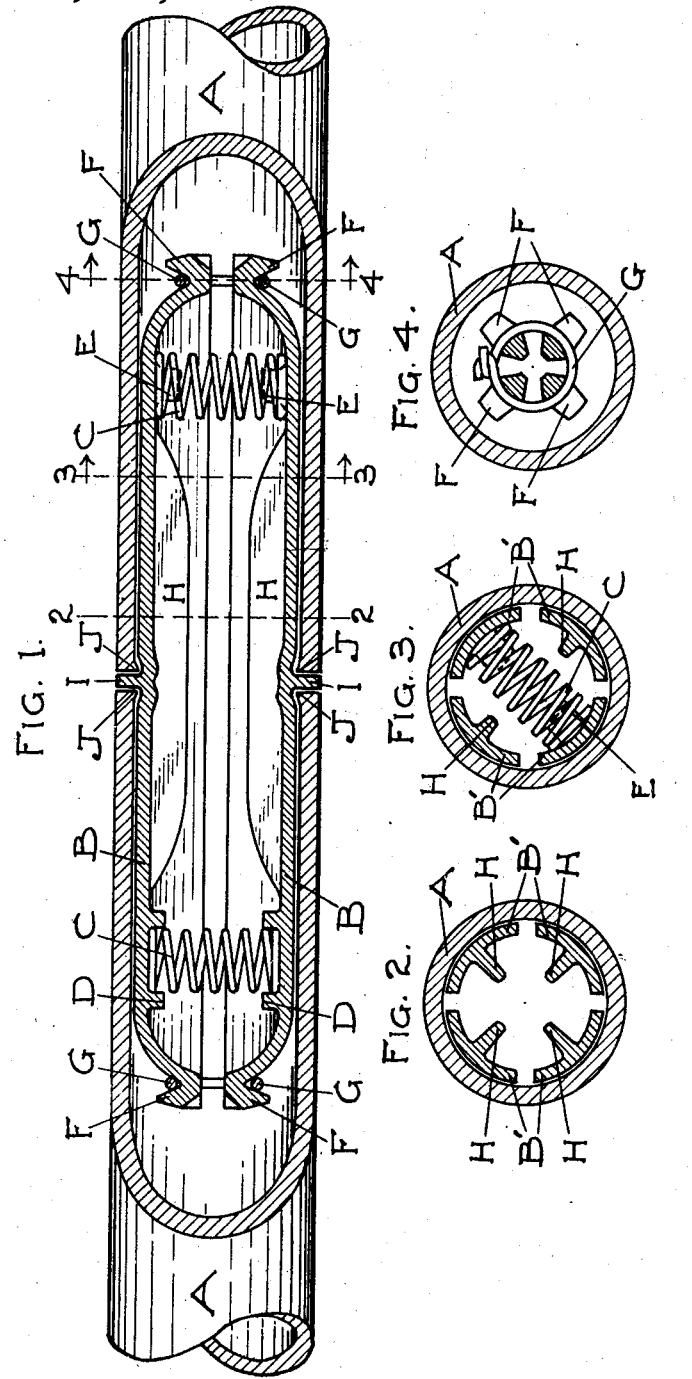
W. LOUDEN.
PIPE COUPLING.
APPLICATION FILED NOV. 10, 1919.
1,344,914.
Patented June 29, 1920.
INVENTOR
William Louden,

WILLIAM LOUDEN, OF FAIRFIELD, IOWA.

PIPE-COUPLING.

1,344,914.     Specification of Letters Patent.     Patented June 29, 1920.

Application filed November 10, 1919. Serial No. 337,084.

*To all whom it may concern:*

Be it known that I, WILLIAM LOUDEN, a citizen of the United States, residing at Fairfield, in the county of Jefferson and State of Iowa, have invented a new and useful Improvement in Pipe-Couplings, of which the following is a specification.

My invention relates to structural couplings for pipes or tubing, and it consists of a structure which may be inserted in the adjoining ends of two sections of a pipe or tubing, whereby said ends may be securely held together and there will be no obstructions on the outside surface of the pipe, the structure being substantially as hereafter described, and as set forth in the claims.

In the accompanying drawings forming a part of this specification, Figure 1 is a side view, partly in section, of two adjoining sections of pipe showing a coupling device comprising two members inserted in their abutting ends and embodying my invention. Figs. 2, 3 and 4 are transverse sections of a coupling device comprising four members drawn on lines through the coupling corresponding to lines 2—2, 3—3 and 4—4 respectively of Fig. 1, the pipes being shown in full and the additional coupling members being added, as will be hereafter explained. Fig. 5 is a detail view of one of the coupling members.

Referring to the drawings, A represents the adjoining ends of two sections of pipe, the abutting ends being in section. B represents a sectional view of two coupling members inserted in the adjoining ends of the pipes. These coupling members are spaced apart and their bodies are formed to fit the inside surface of the pipes while their ends are curved or inclined inwardly toward each other, as shown in Fig. 1.

A pair of compression springs C are inserted between and near the opposite ends of the coupling members, the object of these springs being to spread the members apart and hold them in enforced contact with the inner surface of the pipes, whereby the friction will prevent the sections of pipe from being readily drawn apart. These springs may be held in place by cups formed on the inner faces of the members, as at D, in which the ends of the springs are inserted in the cups, or inwardly projecting pins, as at E may be used, over which the ends of the springs are placed.

The tips of the inwardly curved ends of the coupling members are abruptly disposed outwardly so as to form a substantial recess or neck in which a wire G, having its ends connected together, may be inserted so as to hold the members B together and prevent them and the springs C from falling apart. Instead of the wires any other suitable holding devices for the purpose may be employed.

The wires G, or other holders used, should be adjusted so that the outer faces of the coupling members B will be a little larger than the inside diameter of the pipes. When thus adjusted, the members B will be compressed on the springs when driven into the ends of the pipe, and the springs will be free to force the members out against the inside of the pipes, and will hold the adjoining sections of the pipes together.

In Fig. 1 only two coupling members are shown while in Figs. 2, 3 and 4, transverse sections of four coupling members B', are employed. This is the preferable form of my invention, because it will permit the use of a set of springs for each set of members, thus expanding the coupling members in four directions instead of only two. When only two coupling members are used each member can be made wider and be extended further around the inside diameter of the pipes, but it is better to use four members, notwithstanding that they have to be made narrower, because additional springs can be used and the pressure of the spring will be directed to four sides of the pipe instead of only two. It will also make a more symmetrical device to drive into the ends of the pipes. In Fig. 3, the spring is shown applied to only two of the coupling members B', but it is intended that springs shall also be applied in a similar manner to the other set of coupling members; and when so applied, one set of springs will stand at approximately right angles to the other, transversely considered.

One of the leading uses of my coupling device is to join together the sections of the so-called top rail of cattle stalls when made of pipe or tubing, as they usually are. The sections of pipe or tubing used for this purpose are supported in place by the connections joining them to the stall posts, as known by those skilled in the art. A device of this kind will be sufficient to join the ends of the sections together and has a number of advantages over the devices generally used.

Heretofore the pipes forming the said top-rail have been generally cut to length so the ends of the adjoining sections would coincide with the stall post connections whereby the connection which joins the top-rail to the stall posts would also join the abutting ends of the top-rail sections together. This required the cutting of each section of top-rail pipe to suit the special measurements of the instalment with which it was to be used. This was an expensive proceeding resulting in waste of pipe and extra care and work. Sometimes mistakes were made which had to be rectified and these were also expensive.

When it was attempted to use random lengths of pipe outside couplings were used which were frequently more or less in the way of other attachments, and were otherwise objectionable. My invention overcomes all these troubles and furnishes a cheap easily applied substantial coupling which is entirely inside of the pipe and cannot be in the way of anything. Pipes of random lengths can be used and the adjoining ends can be joined together at any points along the length of the top-rail without any interference whatever.

Fig. 5 is intended to represent an inside view of one of the four piece coupling members B', which when four members are used have to be made narrower than when only two members are used. To strengthen the members it is preferable that inwardly extending ribs H should be used and similar ribs may be also used on the two piece coupling members B, shown in Fig. 1.

To prevent the coupling members from being driven too far into the end of a pipe, I form a rib I transversely around a central portion of the outer surface of the coupling members. This will insure the insertion of the members a substantially equal distance into the adjoining ends of the pipes, which is necessary to secure the best connection. The ends of the pipes, when cut in the ordinary manner, generally have burs on the inner side, as indicated by J in Fig. 1.

To provide for this bur and also to secure a better connection I form transverse grooves J on opposite sides of the rib I to receive these burs as shown in Fig. 1. This arrangement not only provides for the burs which would be liable to hold the coupling members unevenly on the inner surfaces of the pipes, but also helps to make the hold of the coupling members more secure. I do not limit myself to the precise construction shown but what I claim is:

1. In pipe couplings the combination of a plurality of coupling members adapted to be inserted in adjoining ends of pipe sections and means to hold the members in connecting contact with the inner surfaces of the ends of the pipes.

2. In pipe couplings the combination of a plurality of coupling members adapted to be inserted in adjoining ends of pipe sections and means to expand and hold the members in connecting contact with the inner surfaces of the ends of the pipes.

3. In pipe couplings the combination of a plurality of coupling members adapted to be inserted in adjoining ends of pipe sections and springs inserted between the members to force them into contact with the inner surfaces of the ends of the pipes.

4. In pipe couplings, the combination of a plurality of coupling members having their outer surfaces adapted to correspond with the inner surface of a pipe, and to be driven into the ends of two adjoining sections of said pipe, and means to spread the members apart and force them into contact with said inner surfaces.

5. In pipe couplings, the combination of a plurality of coupling members having their outer surfaces adapted to correspond with the inner surface of a pipe, and to be driven into the ends of two adjoining sections of said pipe, and helical springs inserted between the members and adapted to spread the members apart and to hold them in contact with the inner surface of the adjoining ends of the pipes.

6. In pipe couplings, the combination of a plurality of coupling members having their outer surfaces adapted to correspond with the inner surface of a pipe, and to be driven into the ends of two adjoining sections of said pipe, helical springs inserted between the members and adapted to spread the members apart and to hold them in contact with the inner surface of the adjoining ends of the pipes, and means on the inner faces of the members to hold the springs in position on the members.

7. In pipe couplings, two pair of coupling members located intermediate each other, and adapted to be inserted in the ends of two adjoining sections of pipe, and springs between each pair of members adapted to spread the members apart and hold them in contact with the inner surface of the pipes.

8. In pipe couplings, two pair of coupling members located intermediate each other, and adapted to be inserted in the ends of two adjoining sections of pipe, and a pair of springs inserted between and near the ends of each pair of members, said springs being adapted to spread the members apart and hold them in contact with the inner surface of the pipes.

9. In pipe couplings, a plurality of members adapted to be inserted in adjoining ends of pipe sections, means to spread the members apart and hold them in contact with the inner surface of the pipes, and transverse ribs on the outer surfaces of the members near their central portions, adapted to abut the ends of the adjoining pipes.

10. In pipe couplings, a plurality of members adapted to be inserted in adjoining ends of pipe sections, means to spread the members apart and hold them in contact with the inner surface of the pipes, and transverse recesses on the outer surfaces of the members near their central portions adapted to receive and hold inwardly projecting burs on the ends of the pipes.

Fairfield, Iowa, November 7th, 1919.

WILLIAM LOUDEN.